United States Patent Office 2,894,017
Patented July 7, 1959

2,894,017
THIOPHOSPHORIC ACID ESTERS AND THEIR PRODUCTION

Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany No Drawing. Application April 17, 1957
Serial No. 653,284

Claims priority, application Germany April 26, 1956

6 Claims. (Cl. 260—461)

The present invention relates to and has as its objects new and useful thiophosphoric esters and their production. The new esters of this invention may be represented by the following formula:

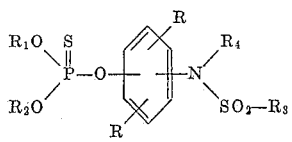

in which each R stands for substituents such as hydrogen, lower alkyl, halogen, nitro and the like, $R_1$ and $R_2$ stand for alkyl radicals especially lower alkyl radicals having from 1–4 carbon atoms, $R_3$ stands for alkyl and aryl radicals which may furthermore be substituted e.g. by halogen, and $R_4$ stands for hydrogen or the radical $SO_2R_3$, in which $R_3$ again has the same significance as described above.

Thiophosphoric acid phenyl esters which contain in their phenyl radical a nitro substituent have become very important insecticides or plant-protecting agents recently. Especially the o-p-nitrophenyl O.O-diethyl thionophosphate which is commonly known as parathion is an outstanding representative of this class of compounds.

It is known, however, that compounds of that type are mostly very poisonous, and therefore intensive work has been done to find other effective phosphoric insecticides with lower toxicity against mammals. Also it is desirable to obtain phosphoric insecticides with more specific activities.

In accordance with the present invention it has now been found that very effective compounds of the above shown class of phosphoric insecticides may be obtained by reacting the corresponding aminophenyl esters with appropriate sulfonic acid halides. This reaction may be seen from the following equation using O-p-aminophenyl-O.O-diethyl-thionophosphate and methane sulfonic acid chloride as reactants:

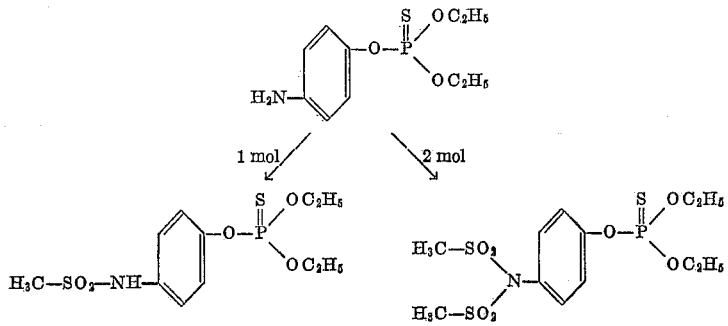

The starting materials, namely the aminophenyl esters, are known from the literature. They may be obtained e.g., by reducing the corresponding nitro esters as it is described by Averell and Norris in Analytical Chemistry volume 20, page 753 (1948) or by O'Keefe and Averell in the same paper, volume 23, page 1167 (1951).

Instead of the p-aminophenyl esters also other similar esters may be used according to this invention. Such compounds include m- or o-aminophenyl esters, p-amino-m-chlorophenyl esters, m-amino-p-o-dichlorophenyl esters or other substituted phenyl esters of that kind. Instead of methane sulfonic acid chloride there may be used as acylating agents according to this invention also other aliphatic sulfonic acid halides such as ethane sulfonic acid chloride, chloromethane sulfonic acid chloride, α-chloroethane sulfonic acid chloride, the o,m- or p-chlorobenzene sulfonic acid chlorides and the like.

The reaction generally is carried out in inert organic solvents such as chloroform, ether, benzene and the like in the presence of appropriate acid binding agents such as especially tertiary organic amines. Examples of those amines are e.g. pyridine, trimethylamine and the like. Generally, the reaction should be carried out at lower temperatures somewhat below 0° C., but also somewhat higher temperatures up to 50–60° C., may be useful for completing the inventive reaction. The last temperature especially may be chosen when organic sulfonic acid chlorides are used.

The compounds of the present invention are generally valuable insecticides and plant-protecting agents. They kill pests such as aphids, flies and mites and exhibit a very remarkable systemic action. The application of these compounds should be carried out according to the use of other known phosphor insecticides, i.e. in dilution of solution with solid or liquid carriers such as chalk, talc, bentonite, water, alcohols, liquid hydrocarbons, etc. The inventive compounds may further be used in combination with other known insecticides or pesticides, etc. Effective concentrations of the compounds may vary also; generally, concentrations of 0.0001% to 1.0% kill pests effectively. The combinations of the compounds may be sprayed or dusted or otherwise brought in contact with pests or plants to be protected. They may also be used as aerosols. The compounds of this invention are especially advantageous for combating mosquito larvae.

As a special example for the utility of the inventive compounds O-(p-[dimethane sulfonyl amino])-phenyl-O.O-diethyl thionophosphate has been dissolved in the same amount of dimethyl formamide. After having added to this solution 20% by weight of a commercial emulsifier such as benzyl-o-hydroxy diphenyl polyglycol ether (containing about 15 glycol residues) it is diluted with water to an aqueous solution containing 0.0000001% of an active ingredient. This solution, when brought in contact with mosquito larvae, kills them completely.

*Example 1*

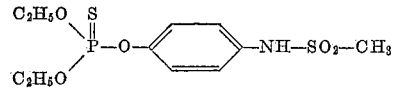

130 grams of a thiophosphate derivative of the following formula

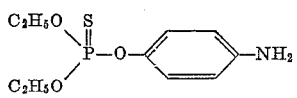

are dissolved in 400 cc. chloroform together with 40 grams pyridin. At room temperature there are added 58 grams methane sulphonic acid chloride. The reaction mixture is poured into ice water, which is acidified with hydrochloric acid. The separated oil is taken up with chloroform, the chloroform solution is shaken with 5% sodium bicarbonate solution, and the chloroform solution is dried over sodium sulphate. After distilling off the solvent there are obtained 130 grams of the new ester as an olive green coloured water-insoluble oil, which cannot be distilled even in high vacuo. Yield: 72% of the theoretical. $LD_{95}$ on rates orally: 1000 mg./kg.

*Example 2*

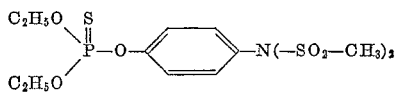

130 grams of a thionophosphate derivative of the following formula

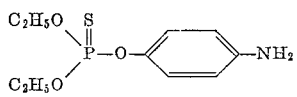

are dissolved in 200 cc. chloroform. There are added 150 cc. triethylamine. While cooling there are dropped in 340 grams methane sulphonic acid chloride at a temperature of about 20° C. When the reaction stops the mixture is warmed for another hour at a temperature of about 60°. Then the reaction mixture is poured into ice water which is acidified with hydrochloric acid. The separated oil is taken up in chloroform and neutralized with 5% bicarbonate solution. After drying over sodium sulphate and distilling off the solvent, there are obtained 195 grams of the new ester. The compound can be recrystallized from anhydrous alcohol and melts at 136° C.

$LD_{50}$ on rats orally: 1000 mg./kg. Solutions of this new ester, which are diluted with water to 1:1000000, are still effective against mosquito larvae.

*Example 3*

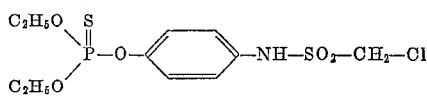

80 grams of a thionophosphate derivative of the following formula

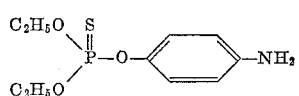

are dissolved in 200 ml. anhydrous ether together with 43 cc. triethylamine. To this solution there are added 85 grams chloromethane-sulphonic acid chloride at a temperature of about —10° C. The mixture is warmed for another hour at a temperature of about 40° C. and the reaction product is then given into ice water, to which diluted hydrochloric acid has been added. The separated oil is taken up in ether and the etherical solution is neutralized by washing with 5% bicarbonate solution. After drying the etherical solution with sodium sulphate, the solvent is distilled off in vacuo. There are obtained 104 grams of the new ester as a water-insoluble oil. Yield: 92% of the theoretical.

$LD_{95}$ on rats orally: 1000 mg./kg. 0.1% aqueous solutions kill spider mites effectively. The compound exhibits a systemic effect against caterpillars.

*Example 4*

130 grams of a thionophosphate derivative of the following formula

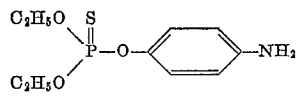

are dissolved in 300 cc. ether together with 150 cc. triethylamine. There are added slowly while cooling at a temperature of about —10° C. 170 grams chloro-methane-sulphonic acid chloride. When the reaction stops, the reactions mixture is slowly allowed to reach room temperature, and then shortly brought to boil. The reaction product is poured into ice water, which is acidified with diluted hydrochloric acid. The separated etherical solution is further diluted with ether and neutralized with 5% sodium-bicarbonate solution. After drying over sodium sulphate, the solvent is removed in vacuo, and there are obtained 235 grams of the new ester of the formula

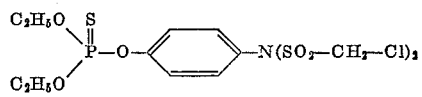

The compound is obtained from ethanol as colourless prisms (M.P. 102° C.). The lethal dose of this compound is about 1000 mg./kg. per os on rats ($LD_{95}$).

*Example 5*

130 grams of a thionophosphate derivative of the following formula

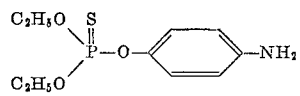

are dissolved in 150 cc. triethylamine and 50 cc. ether. At room temperature there is added a solution of 212 grams p-chlorobenzene sulphonic acid chloride in absolute ether. After finishing the reaction the mixture is stirred for further 2 hours at a temperature of about 45° C. and then it is poured into ice water, which has been acidified with diluted hydrochloric acid. During this process the main part of the reaction product crystallizes in form of colourless crystals. After filtration with suction the etherical solution is separated from the filtrate and evaporated in vacuo. A further crop of substance remains as crystals. There are obtained in total 288 grams of the new ester of the following formula

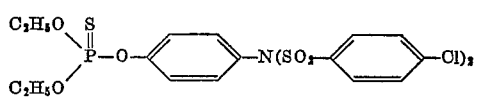

which may be recrystallized from anhydrous alcohol (M.P. 148° C.). The lethal dose of this compound is about 1000 mg./kg. per os on rats orally.

*Example 6*

130 grams of a thionophosphate derivative of the following formula

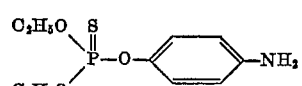

are dissolved in 100 cc. ether and 75 grams triethylamine. There is added a solution of 89 grams benzene sulphonic acid chloride in 100 cc. ether. The reaction temperature should be kept below 45° C. by cooling. After finishing the reaction the temperature is kept for further 2 hours at about 45° C. and the reaction mixture is then poured into ice water, which contains hydrochloric acid. The substance separates as an oil, which is taken up in ether.

After drying the etherical solution the solvent is distilled off in vacuo and the new ester of the following formula

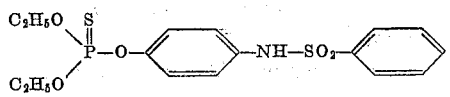

remains in form of an orange yellow coloured oil. Yield: 185 grams, the lethal dose of this compound is about 1000 mg./kg. per os on the rat orally.

*Example 7*

130 grams of a thionophosphate derivative of the following formula

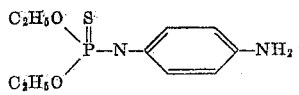

are dissolved in 200 cc. chloroform together with 150 cc. triethylamine. There are added while cooling 177 grams benzene sulphonic acid chloride at a temperature of about 50° C. The solution is warmed for 2 hours more at a temperature of about 60° C. and the reaction mixture then is poured into ice water, which has been acidified with diluted hydrochloric acid. The separated oil is taken up in ether and the etherical solution is shaken with 5% sodium bicarbonate solution. After drying and distilling off the solvent in vacuo there remains a solid transparent substance, which crystallizes immediately when rubbed with anhydrous alcohol. The new ester of the formula

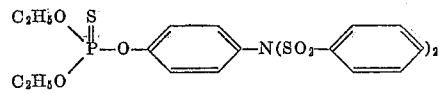

obtained can be recrystallized from anhydrous alcohol (M.P. 85°). The lethal dose of this compound is about 1000 mg./kg. per os on rats orally.

*Example 8*

134 grams of a thionophosphate derivative of the following formula

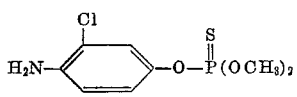

are dissolved in 200 cc. chloroform together with 150 cc. triethylamine and at a temperature of about 0° C. there are added 115 grams methane sulphonic acid chloride. To finish the reaction the mixture is stirred for 4 hours more while cooling and then left standing over night at room temperature. The reaction mixture then is poured into ice water, which has been acidified with diluted hydrochloric acid, and the separated oil is taken up in chloroform. After drying and evaporating the solvent there remains a solid transparent substance, which crystallizes when rubbed with anhydrous alcohol to colourless crystals. The new ester of the formula

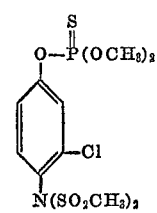

obtained may be recrystallized from anhydrous alcohol (M.P. 122°). The lethal dose of this compound is about 1000 mg./kg. per os on rats orally.

*Example 9*

151 grams of a thionophosphate derivative of the following formula

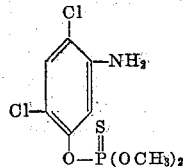

are dissolved in 200 cc. ether and 150 cc. triethylamine. At a temperature of about —5° C. there are added 115 grams methane sulphonic acid chloride, which are dissolved in 150 cc. ether. When the reaction is completed the mixture is diluted with 300 cc. ether and boiled to reflux for a further 2 hours. While pouring the reaction mixture into acidified ice water (which contains hydrochloric acid) the main part of the reaction product crystallizes as a white precipitate. The etherical solution is separated and dried and the solvent is distilled off in vacuo. The remainder is recrystallized from methanol and there are obtained colourless crystals (M.P. 153° C.). The new compound has the following formula

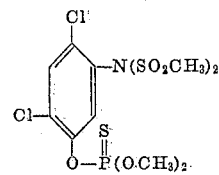

*Example 10*

165 grams of a thionophosphate derivative of the following formula

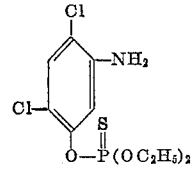

are dissolved in 150 cc. ether together with 150 cc. triethylamine. At a temperature of about —10° C. there are added 115 grams methane sulphonic acid chloride, which are dissolved in 120 cc. ether. After completing the reaction the mixture is boiled to reflux for another hour and poured into ice water, which has been acidified with diluted hydrochloric acid. The separated oil is taken up in ether and evaporated in vacuo after drying over sodium sulphate. The remaining yellow crystalline substance is recrystallized from anhydrous alcohol. The new ester of the formula

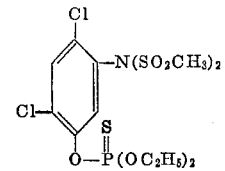

is obtained in form of colourless prisms (M.P. 107° C.). Yield: 225 grams.

*Example 11*

152 grams of a thionophosphate derivative of the following formula

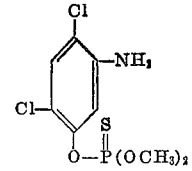

are dissolved in 300 cc. ether together with 75 cc. triethylamine. At a temperature of about −10° C. there are added 75 grams chloro methane sulphonic acid chloride, which are dissolved in 200 cc. ether. The reaction mixture is cooled for another hour and then stirred at room temperature for two hours. The reaction mixture is poured into ice water, which has been acidified with diluted hydrochloric acid. After drying and distilling off the solvent in vacuo there remains a light yellow transparent substance, which crystallizes when rubbed with methanol. The new ester of the formula

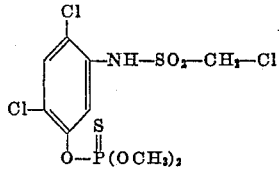

remains in form of colourless leaves (M.P. 115.5° C.). Yield: 205 grams.

What we claim is:

1. A thiophosphoric acid ester of the formula:

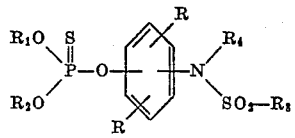

in which R stands for a member selected from the group consisting of hydrogen and chloro, $R_1$ and $R_2$ stand for alkyl radicals having from 1–4 carbon atoms, $R_3$ stands for a member selected from the group consisting of lower alkyl, chloro-substituted lower alkyl, phenyl and chlorophenyl radicals, and $R_4$ stands for a member selected from the group consisting of hydrogen and the radical $SO_2R_3$, in which $R_3$ again has the same significance as described above.

2. A thionophosphoric acid ester of the formula $$\begin{array}{c}C_2H_5O\\ \diagdown\\ C_2H_5O\end{array}\!\!\!\!\overset{S}{\underset{}{\overset{\|}{P}}}\!\!\!-\!O\!-\!\!\!\langle\!\!\bigcirc\!\!\rangle\!\!-\!NH\!-\!SO_2\!-\!CH_3$$

3. A thionophosphoric acid ester of the formula $$\begin{array}{c}C_2H_5O\\ \diagdown\\ C_2H_5O\end{array}\!\!\!\!\overset{S}{\underset{}{\overset{\|}{P}}}\!\!\!-\!O\!-\!\!\!\langle\!\!\bigcirc\!\!\rangle\!\!-\!N(-SO_2\!-\!CH_3)_2$$

4. A thionophosphoric acid ester of the formula $$\begin{array}{c}C_2H_5O\\ \diagdown\\ C_2H_5O\end{array}\!\!\!\!\overset{S}{\underset{}{\overset{\|}{P}}}\!\!\!-\!O\!-\!\!\!\langle\!\!\bigcirc\!\!\rangle\!\!-\!NH\!-\!SO_2\!-\!CH_2\!-\!Cl$$

5. A thionophosphoric acid ester of the formula $$\begin{array}{c}C_2H_5O\\ \diagdown\\ C_2H_5O\end{array}\!\!\!\!\overset{S}{\underset{}{\overset{\|}{P}}}\!\!\!-\!O\!-\!\!\!\langle\!\!\bigcirc\!\!\rangle\!\!-\!N(SO_2\!-\!CH_2\!-\!Cl)_2$$

6. A thionophosphoric acid ester of the formula $$\begin{array}{c}CH_3O\\ \diagdown\\ CH_3O\end{array}\!\!\!\!\overset{S}{\underset{}{\overset{\|}{P}}}\!\!\!-\!O\!-\!\!\!\langle\!\!\bigcirc\!\!\rangle\!\!-\!N(SO_2CH_3)_2$$

(with Cl substituent on ring)

References Cited in the file of this patent

UNITED STATES PATENTS 2,803,580     Metivier _____ Aug. 20, 1957

FOREIGN PATENTS 927,092     Germany _____ Apr. 28, 1955
257,649     Switzerland _____ May 2, 1949

UNITED STATES PATENT OFFICE
Certificate of Correction

Patent No. 2,894,017                                                                July 7, 1959

Ernst Schegk et al.

It is hereby certified that error appears in the printed specification of the above numbered patent requiring correction and that the said Letters Patent should read as corrected below.

Column 5, lines 16 to 19 inclusive, Example 7, the formula should appear as shown below instead of as in the patent—

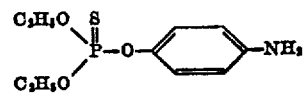

Signed and sealed this 8th day of March 1960.

[SEAL]

Attest:
KARL H. AXLINE,
*Attesting Officer.*

ROBERT C. WATSON,
*Commissioner of Patents.*